(12) United States Patent
Miyabayashi et al.

(10) Patent No.: US 8,770,708 B2
(45) Date of Patent: Jul. 8, 2014

(54) INKJET PRINTER AND RECOVERY METHOD FOR A PRINT HEAD

(75) Inventors: Hirotaka Miyabayashi, Matsumoto (JP); Masashi Fujikawa, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 13/183,654

(22) Filed: Jul. 15, 2011

(65) Prior Publication Data

US 2011/0267391 A1 Nov. 3, 2011

Related U.S. Application Data

(62) Division of application No. 11/542,708, filed on Oct. 3, 2006, now Pat. No. 8,011,751.

(30) Foreign Application Priority Data

Oct. 3, 2005 (JP) ................................. 2005-289663

(51) Int. Cl.
*B41J 2/165* (2006.01)
(52) U.S. Cl.
USPC .......................................................... 347/23
(58) Field of Classification Search
USPC .......................................................... 347/23
See application file for complete search history.

(56) References Cited

U.S. PATENT DOCUMENTS

| 5,572,242 A | 11/1996 | Fujii et al. |
| 6,398,336 B1 | 6/2002 | Yoda et al. |
| 6,938,971 B2 | 9/2005 | Gom z et al. |
| 2007/0076272 A1 | 4/2007 | Miyabayashi et al. |

FOREIGN PATENT DOCUMENTS

| JP | 11129487 A | 5/1999 |
| JP | 2000/85150 | 3/2000 |
| JP | 2001/130108 A | 5/2001 |
| JP | 2001/138602 A | 5/2001 |

OTHER PUBLICATIONS

Notice of Allowance in U.S. Appl. No. 11/542,708 dated Apr. 28, 2011.
Notice of Allowance dated Nov. 18, 2010 in U.S. Appl. No. 11/542,708.

*Primary Examiner* — Julian Huffman
(74) *Attorney, Agent, or Firm* — Nutter McClennen & Fish LLP; John J. Penny, V.

(57) ABSTRACT

An inkjet printer including: a print head for printing by discharging ink droplets from nozzles; a recovery process unit that executes a print head recovery process; a clock unit that counts time; a print operation measuring unit that acquires printing frequency per unit time; and a memory unit that memorizes the printing frequency per unit time; wherein the recovery process unit executes the print head recovery process based on the printing, frequency per unit time in the memory.

18 Claims, 9 Drawing Sheets

INKJET PRINTER AND RECOVERY METHOD FOR A PRINT HEAD

This application is a division of U.S. patent application Ser. No. 11/542,708, filed on Oct. 3, 2006, which claims priority to Japanese Patent Application No. 2005-289663 filed on Oct. 3, 2005, which is hereby incorporated by reference in its entirety.

BACKGROUND OF THE INVENTION

1. Field of Technology

The present invention relates to an inkjet printer, and relates more particularly to a print head recovery method for cleaning the print head regularly or irregularly during inkjet printer operation.

2. Description of Related Art

Inkjet printers print by supplying ink stored in an ink cartridge or other ink source through an ink path to the print head, and then discharging ink droplets from nozzles in the print head onto the recording paper.

In order to prevent problems caused by the viscosity of ink remaining in the nozzles of the print head rising or air bubbles getting into the ink path from the nozzles, inkjet printers regularly vacuum ink from the nozzles of the print head in order to keep the print head in good printing condition.

Paper chaff and ink can also easily adhere to the nozzle face of the print head because the print head nozzle face is separated from the paper surface by a very small gap. When foreign matter such as paper chaff or ink sticks to the nozzle face, printing problems such as nozzle clogging or ink on the nozzle face soiling the paper can occur. Inkjet printers therefore also regularly clean the head to keep the print head in good printing condition by wiping the nozzle face with a sponge or other flexible absorption member to remove any foreign matter.

These ink vacuum and contaminant wiping processes are used to restore the print head to keep the print head in good printing condition, and are commonly referred to as print head recovery or restoration or print head cleaning operations. Print head recovery methods (simply "recovery process" below) are generally executed regularly every time a predetermined time has passed. The recovery process may also be executed irregularly depending upon how much time has passed and the print frequency.

Whether the recovery process is executed regularly or irregularly, the timing for executing the recovery process may come while printing is in progress. If this happens either the recovery process is delayed until after the printing process is completed, or the printing process is interrupted and the recovery process is executed first, but this can disrupt work in progress and is therefore a problem. If an inkjet printer is used as the receipt printer in the POS system of a convenience store, for example, the time for executing the recovery process could come while processing a customer purchase transaction. Giving precedence to the recovery process over the transaction process in this case is obviously undesirable because processing the customer transaction will be forced to wait. On the other hand, giving priority to customer transaction processing is also undesirable because print quality drops as a result of printing the receipt even it is time to execute the recovery process.

Japanese Unexamined Patent Appl. Pub. 2000-085150 teaches a method of addressing these problems by executing the recovery process before the deadline for the recovery process comes in order to prevent the recovery process execution time from arriving while printing is in progress.

The method taught in Japanese Unexamined Patent Appl. Pub. 2000-085150 executes the recovery process a certain amount of time before the deadline for executing the next recovery process comes after the previous recovery process ends. More specifically, the recovery process can be executed any time after a specified time that is before the time at which the next recovery process is required, but the recovery process starts only after first confirming that a printing process has not executed for a predetermined time.

Transaction processes in a supermarket, convenience store, or other retail establishment are executed suddenly and on-demand when a customer is present. A transaction process may therefore be suddenly required after the recovery process has started. Even the method taught in Japanese Unexamined Patent Appl. Pub. 2000-085150 cannot avoid demand for a printing process arising while a recovery process is in progress. More particularly, this method simply sets a predetermined time for executing the recovery process sooner than required, and the time when the recovery process starts could coincidentally come during a busy time. In this situation the likelihood of a transaction process calling a printing process while the recovery process is executing is particularly high.

The preferred time for executing the recovery process varies greatly according to the working environment of the store or business where the inkjet printer is used. This is demonstrated by the great difference in the business hours of a typical supermarket and 24-hour convenience stores, for example. The peak business hours also differ between convenience stores located in shopping areas and convenience stores in residential areas. It will thus be obvious that the best time to execute the print head recovery process depends on the type of business, the store location and environment, the region, the country, and even purchasing habits, and the best time to run the recovery process is therefore preferably set with consideration for these various conditions.

SUMMARY

The present invention therefore provides an inkjet printer and a print head recovery method for executing a print head recovery process at the best time according to the work environment of the inkjet printer.

The invention solves the problem described above by collecting actual printing operation data for each of plural time periods, extracting the time period affording the best timing for the recovery process based on the collected printing operation data for each time period, and executing the recovery process during the extracted time period.

An inkjet printer according to a first embodiment of the invention has a print head for printing by discharging ink droplets from nozzles; a recovery process unit for executing a print head recovery process; a clock unit for outputting time information; a print operation measuring unit for acquiring printing operation data for each time period denoting a printing operation value in each time period; a recovery process starting unit for extracting a low print demand period in which the printing operation value is less than or equal to a predetermined level, setting a recovery process start time so that the print head recovery process is executed in the extracted low print demand period, and starting the recovery process when the start time arrives; and a head recovery drive control unit for controlling the recovery process unit based on the start signal from the recovery process starting unit, and executing the print head recovery process.

The start time of the recovery process is thus set by confirming the actual printing operations executed in specific time periods in the actual working environment and executing the recovery process in a time period when there is least demand for printing as part of normal business operations. As a result, the chance of the print head recovery process conflicting with a business-related printing process is extremely low.

In an inkjet printer according to another embodiment of the invention, the print operation measuring unit acquires a number of lines printed per unit time in each time period as the printing operation value.

If the number of lines printed per unit time is known as a physical quantity representing actual printer operation, the total printing process time in the unit time can also be known. A period in which the number of lines printed is zero, that is, absolutely nothing is printed, is preferably extracted and the print head recovery process is preferably executed in a period when the number of lines printed is zero. Furthermore, because the number of lines printed is also recorded in the maintenance log, the printing operation data for each time period can be easily acquired by linking this log data to time information.

In an inkjet printer according to another embodiment of the invention, the print operation measuring unit acquires a number of print commands per unit time in each time period as the printing operation value.

The print quantity and printing time can be basically determined from each print command in a store, and the number of print commands can therefore be cumulatively counted as the physical quantity denoting the printing operation value. Because there are fewer print commands than printed lines, data compilation is also easier.

In an inkjet printer according to another embodiment of the invention, the recovery process starting unit extracts a time period in which the printing operation value is zero, and extracts a time period in which the printing operation value is less than or equal to a predetermined threshold value if there is no time period in which the printing operation value is zero.

A period in which the business-related demand for printing is lowest, such as when the printing operation value is zero, that is, absolutely nothing is printed, is preferable. However, when there is no time when the printing operation value is zero, a period in which print output is less than or equal to a specific threshold level is extracted as the low print demand period. The threshold level is gradually adjusted until a period in which the printing operation value is less than or equal to the threshold level is found. A period in which the printing operation value is less than or equal to the threshold level can be found by gradually increasing the threshold level from a low to a high value to, for example, first looking for a period in which the number of printing operations per unit time is 1, and if such a period is not found, setting the threshold value to 2 and looking for a period in which the number of printing operations per unit time is 2, and so forth.

In an inkjet printer according to another embodiment of the invention, the recovery process starting unit activates the head recovery drive control unit when the start time comes on the condition that printing did not occur for a predetermined time before the start time.

Before starting the print head recovery process, this embodiment of the invention first confirms if any work-related printing (such as printing a receipt in a sales transaction process) has occurred, or if the likelihood of work-related printing is high, before starting the print head recovery process. The invention sets the recovery process start time so that the recovery process runs at a time when the likelihood of work-related printing is lowest, but the possibility of demand for work-related printing at that time cannot be completely negated. As a result, before actually starting the print head recovery process, whether any printing has occurred within an immediately preceding predetermined period is first determined, and the recovery process is started only if nothing was printed in this period.

A print head recovery method according to another embodiment of the invention is a print head recovery method for an inkjet printer having a print head for printing by discharging ink droplets from nozzles and a recovery process unit for executing a print head recovery process. The recovery method comprises (a) acquiring printing operation data for each time period denoting a printing operation value in each time period; (b) extracting a low print demand period in which the printing operation value is low from the printing operation data for each time period; (c) setting a start time for the print head recovery process in the low print demand period; (d) outputting a start signal to start the recovery process when the start time arrives; and (e) executing the recovery process by controlling driving the recovery process unit based on the start signal.

In a print head recovery method according to another embodiment of the invention, step (b) comprises extracting a time period in which the printing operation value is zero, and extracting a time period in which the printing operation value is less than or equal to a predetermined threshold value if there is no time period in which the printing operation value is zero.

In a print head recovery method according to another embodiment of the invention, step (d) activates the head recovery drive control unit when the start time comes on the condition that printing did not occur for a predetermined time before the start time.

A printing operation value is measured in specific time periods based on actual printer operation in a working environment, and the recovery process start time is set so that the print head recovery process runs in a period in which the likelihood of printing for business purposes is low, such as a period in which nothing is actually printed. The print head recovery process can therefore be run at the best time, that is, when the likelihood of the printer being used is lowest, for the actual working environment in which the inkjet printer is used. The likelihood of the recovery process interfering with printing operations required by the business can therefore be minimized.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of an inkjet printer and a print head recovery method according to the present invention is described below with reference to the accompanying figures.

Figure 1:
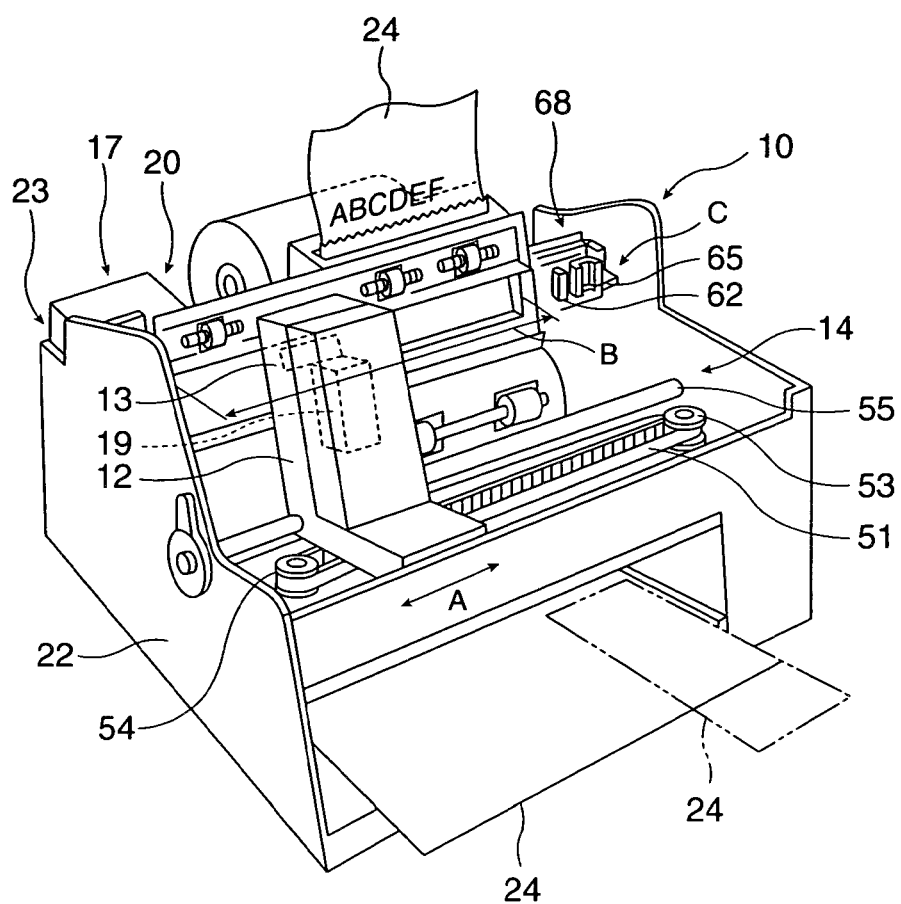
FIG. 1 is an oblique view of an inkjet printer according to the present invention.
Figure 2:
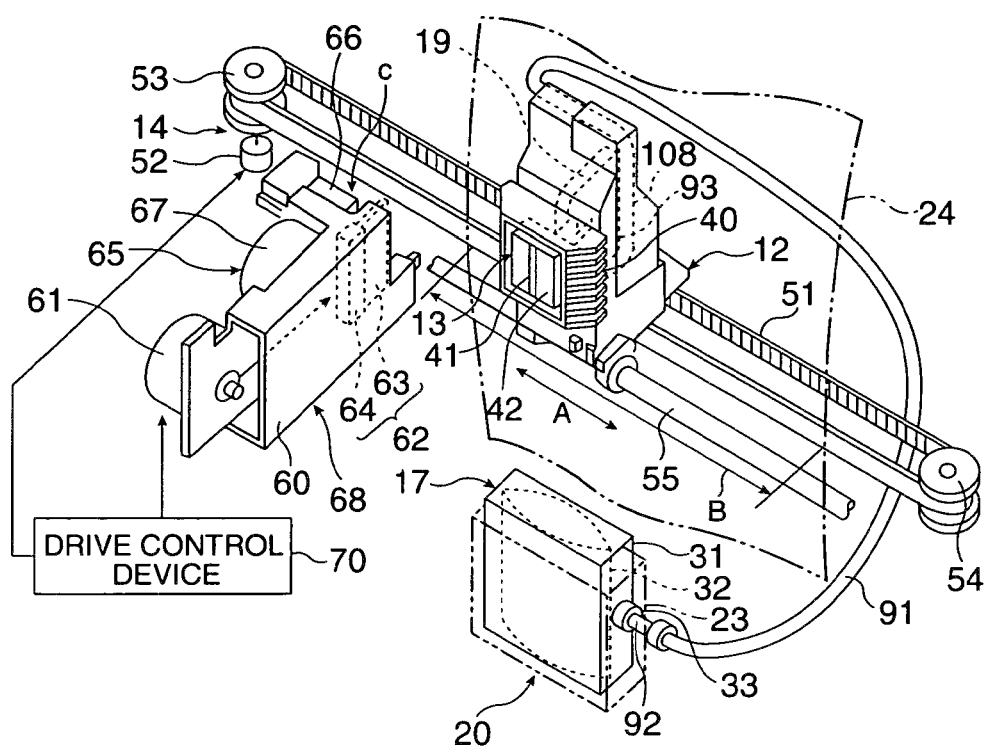
FIG. 2 is an oblique view from the opposite side of the major components in the printer shown in FIG. 1.

FIG. 1 is an oblique view of an inkjet printer according to the present invention, and FIG. 2 is an oblique view from the opposite side of the major components in the printer shown in FIG. 1.

As shown in these figures, the inkjet printer 10 has a print head 13 for discharging ink droplets, a carriage 12 on which the print head 13 is mounted, a transportation mechanism 14 for moving the carriage 12 in the scanning direction denoted by arrow A, and an ink supply mechanism 20 for supplying ink to the print head 13.

As shown in FIG. 2, the print head 13 has a rectangular nozzle face 42 to which a plurality of nozzles 41 for discharging ink is disposed. This nozzle face 42 is exposed through a square opening 40 formed in the carriage 12.

The transportation mechanism 14 for moving the carriage 12 side to side has a guide shaft 55, a timing belt 51 connecting the drive pulley 53 and the driven pulley 54, and a carriage motor 52 for rotationally driving the drive pulley 53. The bottom part of the carriage 12 is supported freely slidably on the guide shaft 55, and is connected to the timing belt 51. As a result, when the carriage motor 52 drives the timing belt 51 circularly, the carriage 12 moves in scanning direction A along the guide shaft 55.

Ink supplied from the ink supply mechanism 20 is discharged from the nozzles 41 of the print head 13 while the carriage 12 moves in scanning direction A. The printing paper 24 is conveyed to a position opposite the nozzle face 42, and the discharged ink droplets are deposited on the surface of the printing paper 24 to print.

The ink supply mechanism 20 has an ink cartridge 17 that is removably installed to an ink cartridge loading unit 23 disposed to the printer frame 22 of the ink supply mechanism 20, a pressure attenuator 19 disposed on the carriage 12, and an ink supply tube 91 connecting the ink cartridge 17 and the pressure attenuator 19.

The ink cartridge 17 has a flexible ink storage unit 32 contained in a hard case 31. An ink supply needle 92 disposed to one end of the ink supply tube 91 is connected to an ink removal opening 33 formed in the ink storage unit 32. The other end part 93 of the ink supply tube 91 is connected to the pressure attenuator 19. Ink stored in the ink storage unit 32 of the ink cartridge 17 is therefore supplied through the ink supply tube 91 to the pressure attenuator 19, and from the pressure attenuator 19 to the print head 13. Ink thus supplied to the print head 13 is then discharged from the nozzles 41.

A recovery process unit 68 is disposed to a position opposite the home position of the carriage 12 as indicated by arrow C. This recovery process unit 68 has a head wiping mechanism 62 and an ink vacuum mechanism 65 as the head recovery mechanisms for restoring print head 13 performance.

The ink vacuum mechanism 65 has a cap 66 for covering the nozzle face 42 of the print head 13 when the print head 13 moves to the home position C. The cap 66 is set to a position retracted toward the unit case 60 when the carriage 12 is moving through the recording area B. When the carriage 12 moves to the home position C, the cap 66 moves from the unit case 60 to a forward projecting position and covers the nozzle face 42 of the print head 13.

A pump 67 operated by a motor 61 attached to the unit case 60 lowers the pressure inside the cap 66. An ink vacuuming process (recovery process) for vacuuming and removing ink from the nozzles 41 can therefore be applied by operating the pump 67 while the cap 66 covers the nozzle face 42. This removes bubbles and high viscosity ink from inside the print head 13, and can therefore restore the ink inside the print head 13 to the appropriate condition.

As shown in FIG. 2, the head wiping mechanism 62 has an elastically deformable blade 63, and a blade support member 64 for supporting the blade 63. The blade support member 64 can be moved by a motor 61 attached to the unit case 60 by way of an intervening gear train or other transfer mechanism (not shown in the figure) disposed inside the unit case 60, and can be switched between a retracted position inside the unit case 60 and a working position projecting from the unit case 60. When the blade 63 projects from the unit case 60, the distal edge part of the blade 63 contacts the nozzle face 42 as the carriage 12 moves from recording area B to home position C, and thus wipes ink and paper chaff from the nozzle face 42.

As known from conventional literature, a drive control device 70 including a microcomputer controls the driving of the print operation of the print head 13 of the inkjet printer 10, operation of the printing paper 24 transportation mechanism (not shown in the figure), and operation of the ink vacuum mechanism 65 and head wiping mechanism 62. The drive control device 70 controls the operation of the various parts as a result of a CPU executing a drive control system comprising a control program stored in ROM using RAM as working memory.

Figure 3:
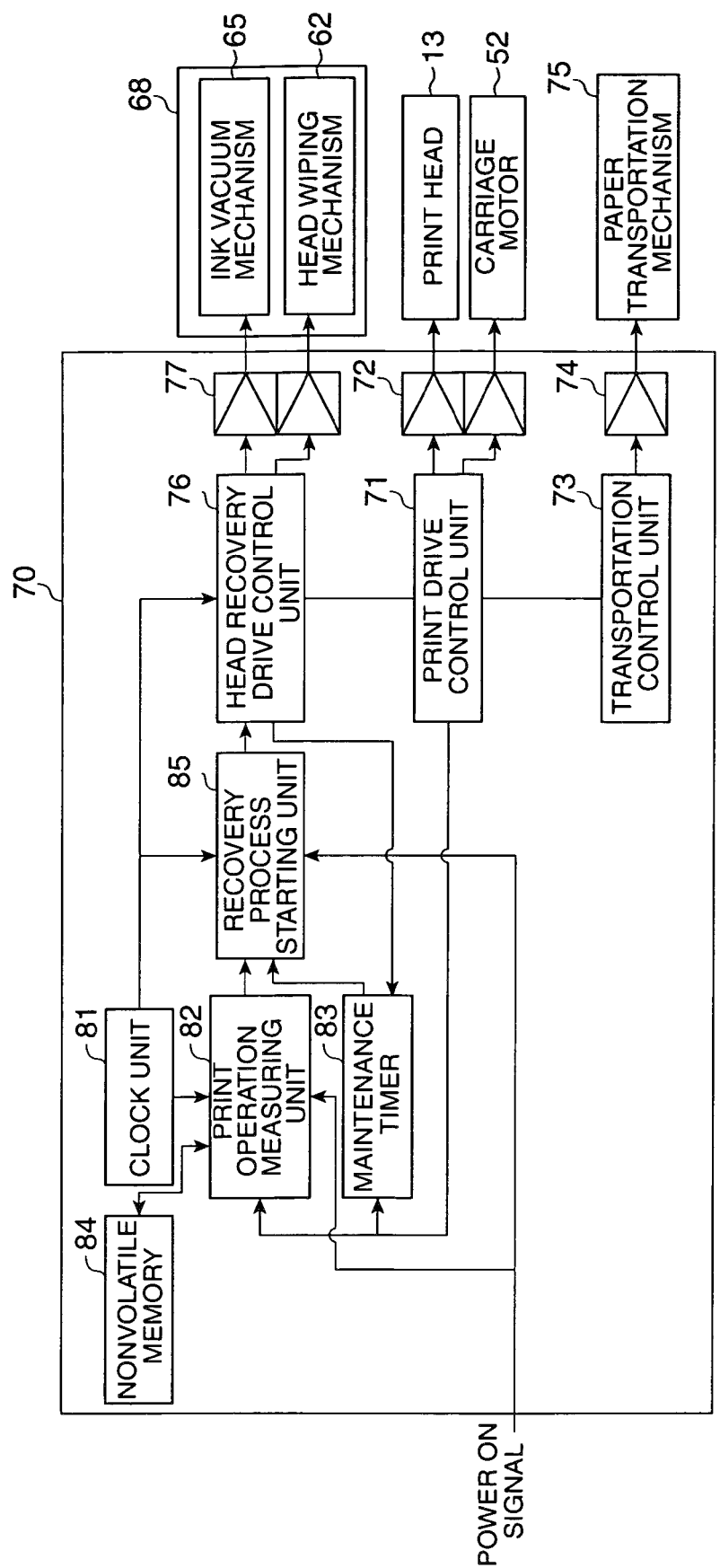
FIG. 3 is a function block diagram showing the functions executed by the drive control system of the inkjet printer shown in FIG. 1 as function blocks.

FIG. 3 is a function block diagram showing the functions executed by the drive control system of the inkjet printer shown in FIG. 1 as function blocks. FIG. 3 shows the startup and drive control functions of the recovery process unit 68 (consisting of the ink vacuum mechanism 65 and head wiping mechanism 62) that executes the print control function, transportation control function, and print head recovery process.

Unless otherwise stated below, the print head recovery process (also referred to below as simply the recovery process) in this embodiment of the invention includes either an ink vacuuming operation in which the ink vacuum mechanism 65 sucks ink from the nozzles, or a wiping operating in which the head wiping mechanism 62 wipes ink and paper chaff from the nozzle face, or a combination of both operations.

As shown in FIG. 3, the print drive control unit 71 controls driving the carriage motor 52 and print head 13 by way of a driver 72 to print as desired on the printing paper. The transportation control unit 73 controls driving the paper transportation mechanism 75, including the transportation motor, through driver 74 in conjunction with the printing operation.

The head recovery drive control unit 76 controls driving the print head recovery process of the ink vacuum mechanism 65, which includes the pump motor 61. When the recovery process runs, the head recovery drive control unit 76 drives the carriage to move the print head 13 to a predetermined position, and controls the recovery process unit 68 to drive the particular ink vacuuming operation or head wiping operation.

The head recovery drive control unit 76 is activated by a start signal from the recovery process starting unit 85. The recovery process starting unit 85 extracts the time period in which the likelihood of a printing process is low based on the time signal from the clock unit 81 and the printing operation data received for each time period from the print operation measuring unit 82, and sets the time for starting the recovery process in the extracted time period.

The maintenance timer 83 starts counting when the recovery process ends, and is reset when the next recovery process starts. The recovery process starting unit 85 refers to the time information of the maintenance timer 83 to set the recovery process time so that the recovery process starts at least before the recovery process deadline comes.

Figure 4:
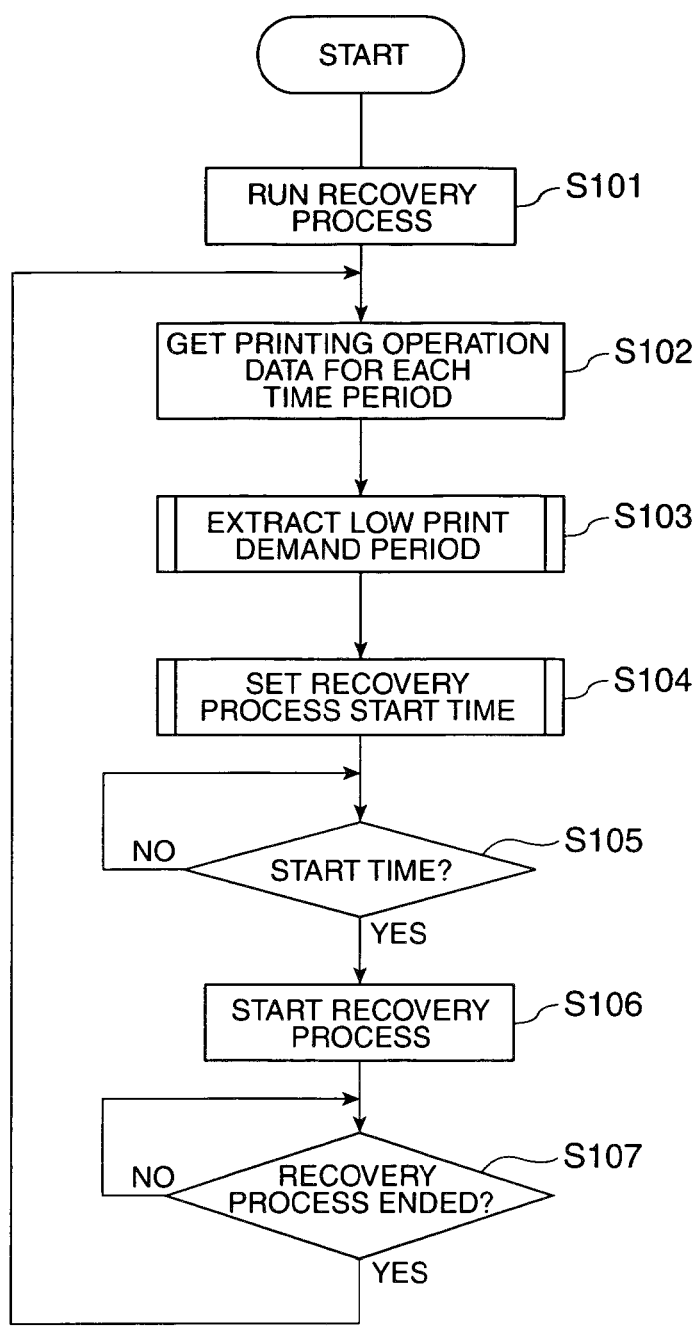
FIG. 4 is a flow chart describing the operation of the recovery process starting unit.

Operation of the recovery process starting unit 85 is described next. FIG. 4 is a flow chart describing the operation of the recovery process starting unit 85.

The recovery process starting unit starts operating when the power turns on. The recovery process starting unit 85 first starts the print head recovery process when the power turns on (S101). This removes ink remaining in the nozzles of the print head while the power was off from the nozzles to keep the print head in good printing condition.

The printing operation data for each time period describing the recent printing operations of the printer is then acquired in order to find the time that is appropriate for executing the next recovery process (S102). The printing operation data for each time period is data representing the actual printing operations in each period, and tabulates values quantifying specific printing operations per unit time, such as one hour or 30 minutes, for example, in each time period. The physical quantities collected in the printing operation data can be any value representing the intensity (operating density) of the printing process per unit time.

Based on the printing operation data for each time period, a low print demand period, which is a time period in which few printing operations are executed, is extracted (S103). The extracted low print demand period is preferably a time period in which a printing operation is not executed even once during the unit time, that is, a time period in there are zero printing operations or zero lines are printed. The number of lines printed is used as the printing operation data below for example only.

The recovery process start time is then set in the extracted low print demand period (S104). When the set start time comes after the recovery process start time is set (S105 returns Yes), the recovery process starting unit 85 outputs the recovery process start signal to activate the head recovery drive control unit 76 (S106). When the recovery process start signal is sent to the head recovery drive control unit 76, the recovery process unit 68 is driven and the recovery process executes. When the recovery process ends (S107 returns Yes), the printing operation data for each time period is acquired again (S102) to set the next recovery process starting time (S103, S104). This process thereafter repeats to execute the recovery process.

By thus running the recovery process in a period when the likelihood of a printing process running is low based on the operating conditions of actual printing processes, the invention minimizes the possibility of the recovery process operation competing with a printing operation executed as part of normal business operations.

The first time the power is turned on after installation, no printing operation data for each time period is available, and the printing operation data for each time period therefore cannot be acquired in step S102. As a result, a low print demand period cannot be extracted (S103). In such circumstances when the printing operation data for each time period cannot be acquired, the step for setting the recovery process time (S104) preferably sets the time for the recovery process so that the recovery process runs in a time period in which the likelihood of a printing process executing is generally low, such as at 3:00 a.m. During the time until the printing operation data for each time period can be acquired, the acquisition process in step S102 can be delayed and step S102 is executed after this delay is over. The time in which the acquisition process of step S102 is delayed must be shorter than the longest time that continuous operation is possible without executing the recovery process (the maximum recovery process delay time). The maximum recovery process delay time in modern inkjet printers is 48 hours, and a delay time of 24 hours can therefore be easily set.

Figure 5:
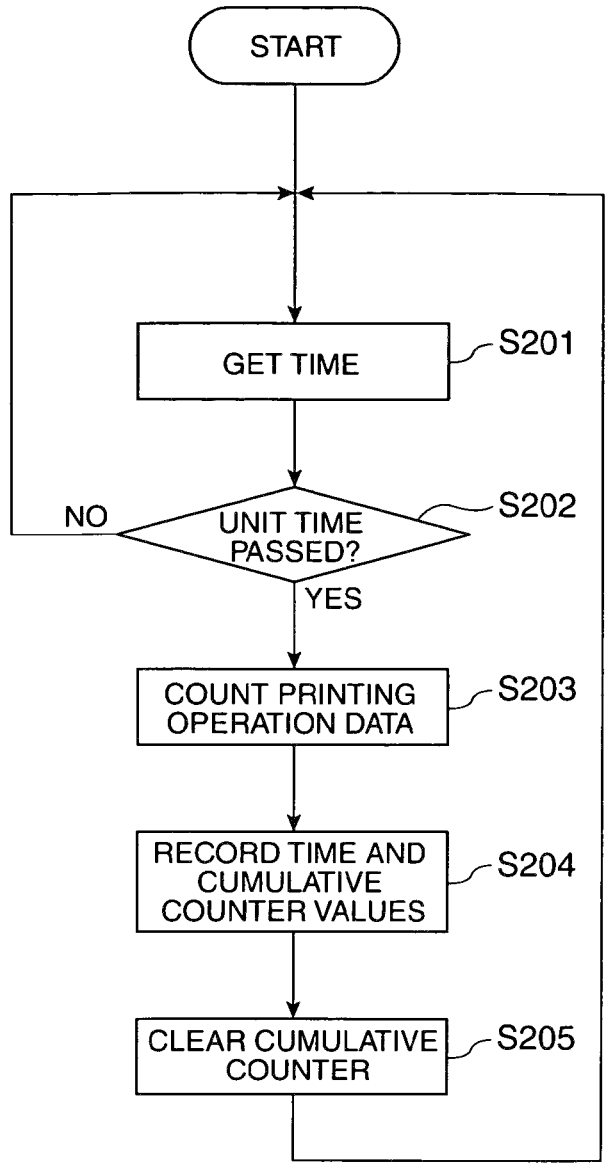
FIG. 5 is a flow chart showing the process run by the print operation measuring unit to acquire the printing operation data for each time period.

FIG. 5 is a flow chart showing the process run by the print operation measuring unit 82 to acquire the printing operation data for each time period.

The print operation measuring unit 82 has a cumulative counter (not shown in the figure), and counts the number of lines printed or the number of print commands, for example, as the printing operation data. The print operation measuring unit 82 also has a printing operation recording unit (not shown in the figure) for storing by time period the cumulative printing operation data for each unit time.

The process shown in FIG. 5 starts when the power turns on, and the current time is acquired from the clock unit 81 (S201). The print operation measuring unit 82 then waits until the predetermined time that is the end of the unit time (until S202 returns No). During this waiting period the cumulative counter not shown accumulates the printing operation data.

When the predetermined unit time has passed (S202 returns Yes), the cumulative count of the printing operation data is acquired from the cumulative counter (S203), and the cumulative counter values, that is, the printing operation data per unit time, are stored together with the time information in the printing operation recording unit (S204). The cumulative counter is then cleared (S205) and the cumulative counter starts counting the printing operation data per unit time for the next time period (S201 to S204). This process repeats per unit time to produce the printing operation data for each time period.

Figure 6:
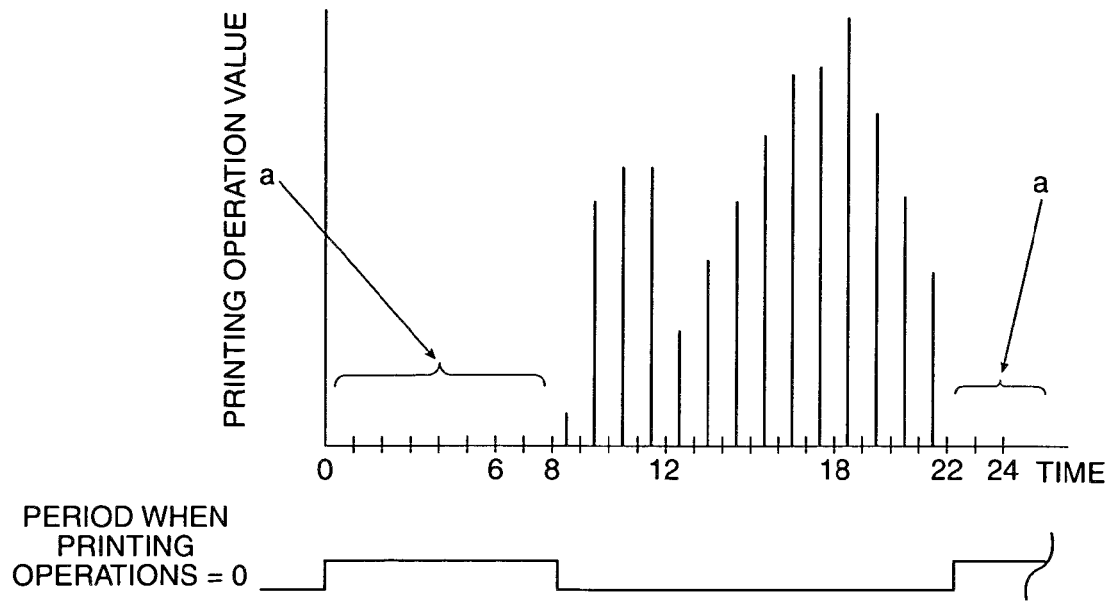
FIG. 6 is a graph showing an example of the printing operation data for each time period stored by the print operation measuring unit.
Figure 7:
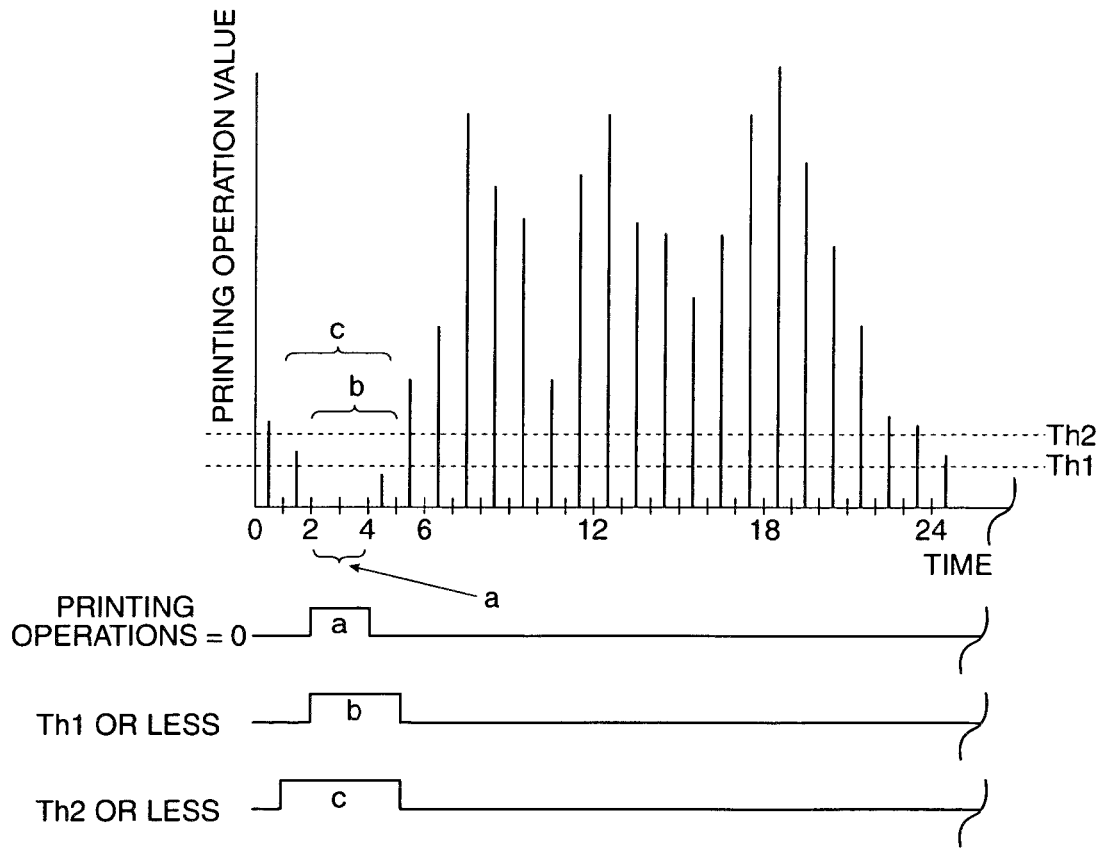
FIG. 7 is a graph showing another example of the printing operation data for each time period stored by the print operation measuring unit.

FIG. 6 and FIG. 7 show examples of the printing operation data for each time period recorded in the printing operation recording unit (not shown in the figure) of the print operation measuring unit 82.

The printing operation data for each time period shown in FIG. 6 is a record of the operation of a receipt printer in a POS terminal used in a supermarket that opens at 8:00 a.m. and closes at 10:00 p.m. (22:00). Because nothing is printed while the store is closed, this time period (from 22:00 to 8:00) is the time period in which the number of lines printed is zero (denoted by 'a' in the figure).

FIG. 7 shows the printing operation data for a receipt printer (inkjet printer) installed in a store that is open 24-hours a day, such as a convenience store. Time period a in which there are no printing operations (number of printed lines equals zero) is the two hour period from 2:00 to 4:00 a.m., and a printing process (transaction process) is executed in each of the other time periods.

As shown in FIG. 6 and FIG. 7, when there is a period in which the number of lines printed is zero, that time period is extracted as the low print demand period.

Figure 8:
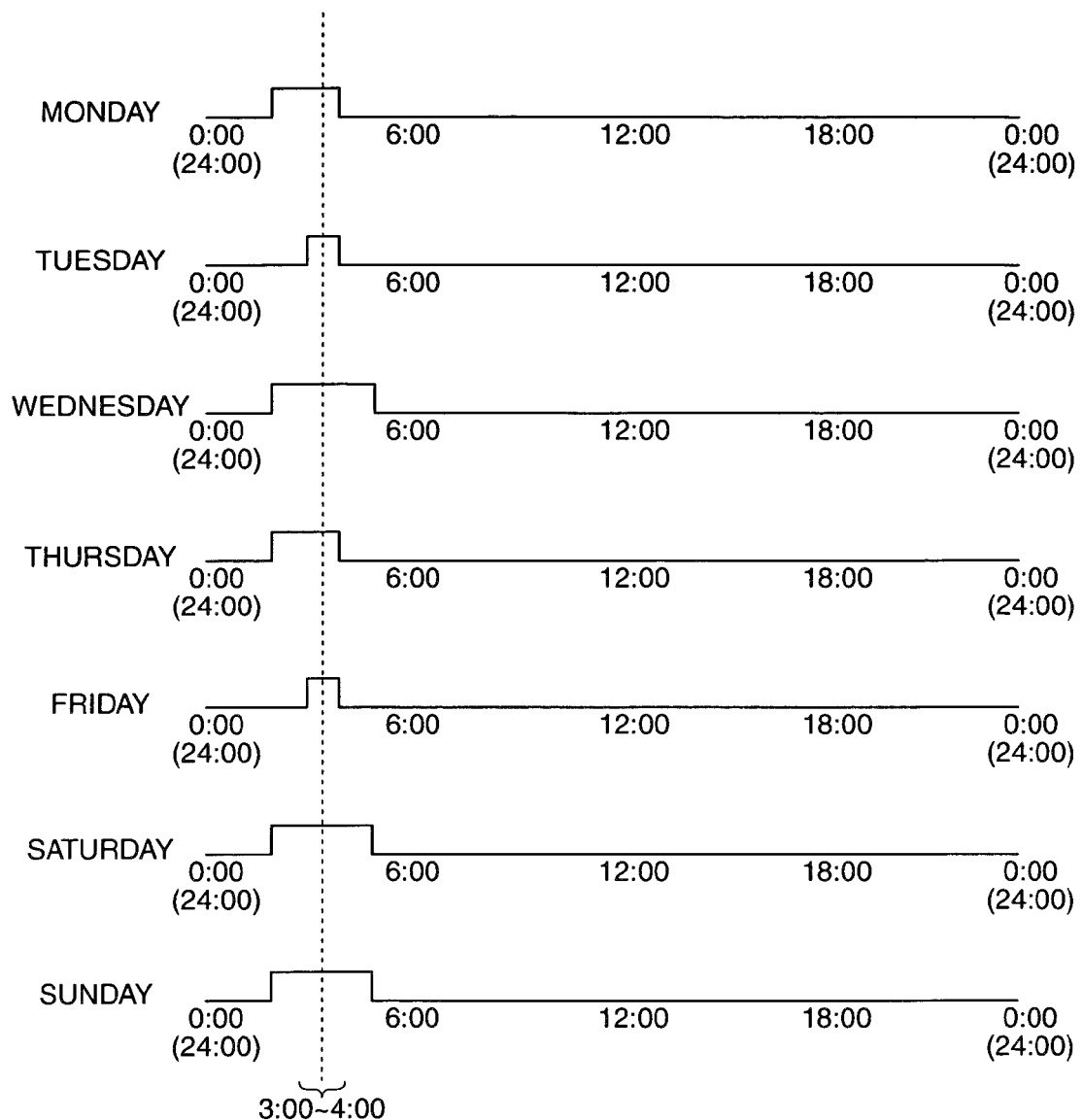
FIG. 8 is a timing chart for a one week period showing time lines showing the periods in each day in which nothing is printed.

In order to set the low print demand period more accurately, the low print demand period that is best for executing the recovery process can be extracted based on printing operation data accumulated for a one week period as shown in FIG. 8. FIG. 8 is a timing chart for a one week period showing time lines representing the periods in each day from Monday to Sunday in which nothing is printed in one hour units. When the period in which there are zero print lines varies according to the day of the week as shown in this example, the period of 3:00 to 4:00 a.m. that is common to each day is preferably set as the low print demand period. If there is no time period that is common to every day, the period that is common to the most days is preferably selected.

If there is no period in which nothing is printed, a plurality of threshold values Th1, Th2 are set as shown in FIG. 7, and the period in which the quantity denoting the printing operations is less than or equal to the threshold value (periods b and c in FIG. 7) is extracted.

Figure 9:
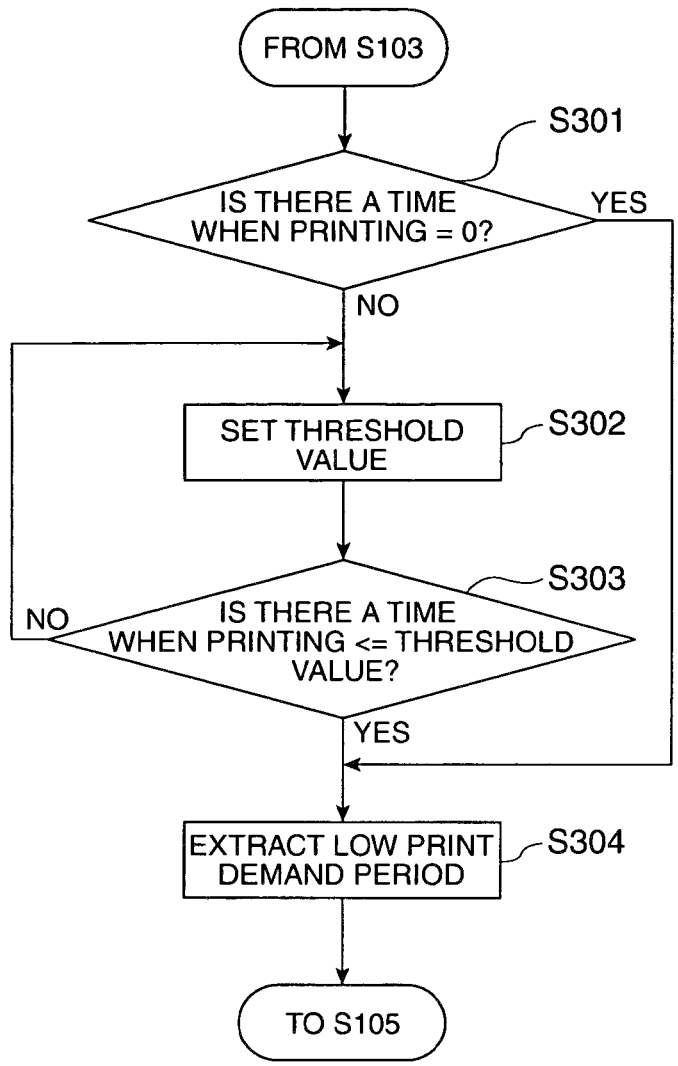
FIG. 9 is a flow chart describing the process run by the print operation measuring unit to extract the low print demand period.

FIG. 9 is a flow chart describing the process for extracting the low print demand period. Whether there is a period in which the number of lines printed is zero is found in the printing operation data (S301) is first confirmed. If there is (S301 returns Yes), that time period is extracted as the low print demand period (S304).

If there is no period in which the number of lines printed is zero (S301 returns No), the lowest threshold value Th1 is set (S302), and whether there is a period in which the printing operation value is less than or equal to this threshold value is determined (S303). If a period in which the printing quantity is less than or equal to Th1 is detected (S303 returns Yes), that time is extracted as the low print demand period (S304).

If a period in which the printing quantity is less than or equal to Th1 is not detected (S303 returns No), the second lowest threshold value Th2 is set (S302), and whether there is a period in which the printing operation value is less than or equal to this threshold value is determined (S303). If a period in which the printing quantity is less than or equal to Th2 is detected (S303 returns Yes), that time is extracted as the low print demand period (S304). If not (S303 returns No), the third lowest threshold value is set and steps S302 and S303 repeat. The threshold value is gradually increased until a low print demand period is found. As a result, the time period in which business related printing operations are least likely to occur can be extracted.

When there are plural low print demand periods, the recovery process start time can be set in the desired period. Because the recovery process is preferably executed as infrequently as possible, the time that is farthest from the last recovery process is preferably set as the low print demand period. Alternatively, a period in which there are multiple consecutive low print demand periods can be found, and the start time can be set to the middle of this period. Alternatively, printing operation data for each time period over a period of multiple days can be referenced to set a time that is common to as many days as possible as the time for the recovery process.

Generating the recovery process start signal is described next. The recovery process starting unit 85 can be arranged to output the start signal for activating the head recovery drive control unit 76 as soon as the set start time arrives. However, while the start time set in the low print demand period should be in a period in which the probability of a printing process executing is low, there is the possibility that a printing process will be in progress when the start time comes. The start signal is therefore preferably output after first confirming that printing is not underway. Further preferably, the start signal is output when the recovery process start time comes only if nothing has been printed for a predetermined period before the start time (such as five minutes).

Figure 10:
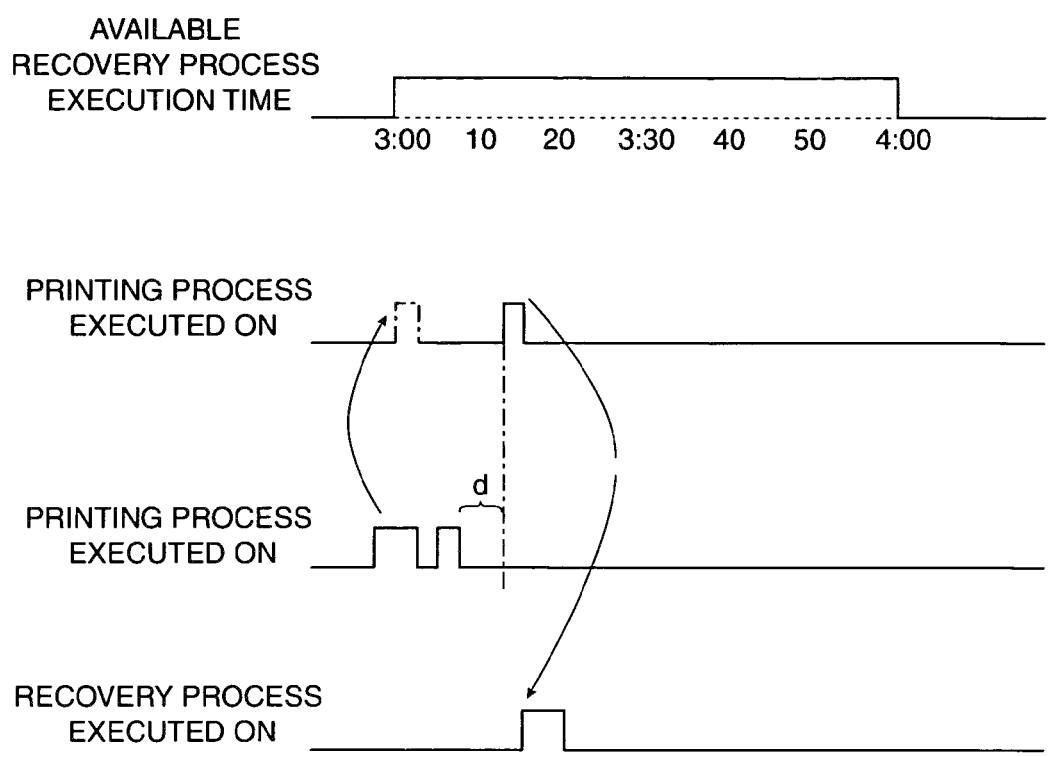
FIG. 10 is a timing chart showing the timing at which the recovery process starting unit outputs the start signal.

This is described further with reference to FIG. 10. FIG. 10 is a timing chart showing the timing at which the recovery process starting unit 85 outputs the start signal. In this example the period in which the recovery process can be executed (the selected low print demand period) is from 3:00 to 4:00, and the recovery process start signal is set to 3:00.

The start signal should be output when the start time of 3:00 comes, but the start signal output is suppressed (as indicated by the broken line) because a printing process was executed during the immediately preceding five minute period (the length of this period can be set as desired, and the start delay time is set to five minutes by way of example only). Outputting the start signal is suppressed for five minutes after the last printing process ends. Because another printing process executes after the first printing process ends in the example shown in FIG. 10, the start signal is output five minutes after the last printing process ends as denoted by d. This activates the head recovery drive control unit 76 and causes the recovery process unit to run the recovery process.

An inkjet printer generally runs a recovery process when the power turns on, and must run the print head recovery process again after at most 30 hours to 48 hours after the last recovery process ends. In a business that has a fixed opening time and a fixed closing time every day, turns the inkjet printer power on at the start of business each day, and turns the inkjet printer power off at the end of each business day, the print head recovery process is executed every time the power turns on, the power turns off before the next print head recovery process is needed, and the timing of the print head recovery process is not a particular problem. There are, however, many businesses where the printers are always on, such as convenience stores that are open 24-hours a day and printer power is always on, and businesses that do not turn the printer power off at the end of the business day. The present invention enables running the print head recovery process at the best time in such cases, and thus prevents the print head recovery process from interfering with normal business operations.

In order to save the printing operation data when printer power is off, nonvolatile storage devices can be used for the cumulative counter and printing operation recording unit (both not shown in the figures). Alternatively, this data can be saved to volatile memory when the power is on, and can be written to nonvolatile memory 84 (see FIG. 3) during the shutdown sequence. In this case the data is read from nonvolatile memory 84 into the cumulative counter and printing operation recording unit rendered in volatile memory as part of the startup sequence when printer power turns on. Printing operation data cannot be acquired when printer power is off, but because no printing occurs when the power is off, the period from the time when the power turns off to the time when the power turns on can be counted as a time period in which the printing operation value is zero.

Inkjet printers normally maintain a maintenance log relating to printing operations. If this log data includes the number of lines printed or the number of print commands, this log data can be linked to time information and stored as the printing operation data for each time period.

Although embodiments of the present invention have been described above, the present invention is not limited to the above-mentioned embodiments, and various kinds of modifications can be made without departing from the scope of this invention.

What is claimed is:

1. An inkjet printer comprising:
a print head for printing by discharging ink droplets from nozzles;

a recovery process unit that executes a print head recovery process;

a clock unit that counts time;

a print operation measuring unit that acquires a count of a number of print operations that occur during a time period counted by the clock unit, the time period being a length of time in a day; and a memory unit that memorizes the count; wherein the recovery process unit executes the print head recovery process based on the count in the memory unit;

the recovery process unit sets a low print demand period so that the recovery process unit executes the print head recovery process in the low print demand period; and the recovery process unit sets the low print demand period corresponding to the time period having a zero count, except when none of the time periods have a zero count, the recovery process unit sets the low print demand period corresponding to the time period having a count that is less than or equal to a predetermined threshold value.

2. The inkjet printer described in claim 1, wherein the number comprises a number of lines printed during the time period.

3. The inkjet printer described in claim 1, wherein the number comprises a number of print commands during the time period.

4. The inkjet printer described in claim 1, wherein the recovery process unit executes the print head recovery process when the count is zero, or the count is less than or equal to the predetermined threshold value.

5. The inkjet printer described in claim 1, wherein the recovery process unit executes the print head recovery process when printing did not occur for a predetermined time before a start time of the recovery process.

6. The inkjet printer described in claim 1, wherein the print operation measuring unit acquires at least one additional count, each at least one additional count being a number of print operations that occur during a time period subsequent to the time period for a previous count;

the memory unit memorizes each of the at least one additional counts; and the recovery process unit executes the print head recovery process based on the at least one additional counts in the memory unit.

7. The inkjet printer described in claim 1, wherein the length of time in the day is predetermined.

8. The inkjet printer described in claim 1, wherein the print operation measuring unit acquires a count of a number of print operations that occur during each of a plurality of additional time periods counted by the clock unit, each of the additional time periods occurring in the day and having a length equal to the length of time in the day; and the memory unit memorizes the count of the number of print operations that occur during each of the plurality of additional time periods.

9. The inkjet printer described in claim 8, wherein the length of time in the day is at least 30 minutes such that the memory unit memorizes no more than 48 counts for the day.

10. The inkjet printer described in claim 1, wherein the print operation measuring unit acquires a count of a number of print operations that occur during each of a plurality of additional time periods counted by the clock unit, each of the additional time periods occurring in a day subsequent to the day and having a length equal to the length of time in the day and corresponding to a same time of day as the length of time in the day; and the memory unit memorizes the count of the number of print operations that occur during each of the plurality of additional time periods.

11. The inkjet printer described in claim 10, wherein the recovery process unit executes the print head recovery process based on the count in the memory unit when the count is less than or equal to a non-zero threshold value.

12. An inkjet printer comprising:

a print head for printing by discharging ink droplets from nozzles;

a recovery process unit that executes a print head recovery process;

a clock unit that counts time;

a print operation measuring unit that acquires a count of a number of print operations that occur during a time period counted by the clock unit, the time period being a length of time in a day; and a memory unit that memorizes the count; wherein the recovery process unit executes the print head recovery process based on the count in the memory unit;

the recovery process unit executes the print head recovery process based on the count in the memory unit when the count is less than or equal to a non-zero threshold value; and the recovery process unit sets the non-zero threshold value based on a previous time period having a lowest non-zero number of printing operations performed by the print head.

13. A print head recovery method for an inkjet printer having a print head for printing by discharging ink droplets from nozzles and a recovery process unit for executing a print head recovery process, the recovery method comprising:

(a) acquiring a count of a number of print operations that occur during a time period, the time period being a length of time in a day;

(b) memorizing the count; and (c) executing the print head recovery process by the recovery process unit based on the memorized count, the method further comprising setting a low print demand period so that the print head recovery process is executed in the low print demand period; and setting the low print demand period corresponding to the time period having a zero count, except when none of the time periods have a zero count, setting the low print demand period corresponding to the time period having a count that is less than or equal to a predetermined threshold value.

14. The print head recovery method described in claim 13, wherein:

step (c) comprises executing the print head recovery process when the count is zero, or the count is less than or equal to the predetermined threshold value.

15. The print head recovery method described in claim 13, wherein:

step (c) comprises executing the print head recovery process when printing did not occur for a predetermined time before a start time of the print head recovery process.

16. The print head recovery method described in claim 13, further comprising:

(d) acquiring at least one additional count, each at least one additional count being a number of print operations that occur during a time period subsequent to the time period for a previous count, (e) memorizing each of the at least one additional counts; and (f) executing the print head recovery process based on the memorized at least one additional counts.

17. An inkjet printer comprising:
a print head for printing by discharging ink droplets from nozzles;
a recovery process unit that executes a print head recovery process;
a clock unit that counts time;
a print operation measuring unit that acquires a count of a number of print operations that occur during a time period counted by the clock unit, the time period being a length of time in a day; and
a memory unit that memorizes the count; wherein
the recovery process unit executes the print head recovery process based on the count in the memory unit;
the print operation measuring unit also acquires a count of a number of print operations that occur during each of a plurality of time periods counted by the clock unit; and
the recovery process unit executes the print head recovery process at a time after passage of the time period and the plurality of time periods, the time being based on a comparison of the count in the memory unit with the acquired counts for each of the plurality of time periods.

18. An inkjet printer comprising:
a print head for printing by discharging ink droplets from nozzles;
a recovery process unit that executes a print head recovery process;
a clock unit that counts time;
a print operation measuring unit that acquires a count of a number of print operations that occur during each of a plurality of time periods counted by the clock unit; and
a memory unit that memorizes each of the counts;
wherein the recovery process unit compares each of the counts in the memory unit so as to determine which of the plurality of time periods had a lowest number of print operations occurring therein; and
wherein the recovery process unit executes the print head recovery process at a time subsequent to each of the plurality of time periods and corresponding to the time period determined to have the lowest count.

* * * * *